United States Patent
Bursac et al.

(10) Patent No.: US 12,547,632 B1
(45) Date of Patent: Feb. 10, 2026

(54) METHOD AND APPARATUS FOR AUTOMATED QUERY GENERATION FOR SEARCH SYSTEM QUALITY ASSESSMENT

(71) Applicant: HERE GLOBAL B.V., Eindhoven (NL)

(72) Inventors: Diana Bursac, Libertyville, IL (US); Pamela Korda, Chicago, IL (US); Arnold Sheynman, Northbrook, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 18/943,983

(22) Filed: Nov. 12, 2024

(51) Int. Cl.
*G06F 16/00* (2019.01)
*G06F 16/242* (2019.01)
*G06F 16/2455* (2019.01)
*G06F 16/29* (2019.01)

(52) U.S. Cl.
CPC .... *G06F 16/24562* (2019.01); *G06F 16/2425* (2019.01); *G06F 16/243* (2019.01); *G06F 16/29* (2019.01)

(58) Field of Classification Search
CPC .......... G06F 16/24562; G06F 16/2425; G06F 16/243; G06F 16/29
See application file for complete search history.

(56) References Cited

U.S. PATENT DOCUMENTS

| | | |
|---|---|---|
| 2008/0027937 A1 | 1/2008 | Winberry et al. |
| 2012/0209818 A1 | 8/2012 | Richter et al. |
| 2013/0232006 A1* | 9/2013 | Holcomb ............ G06F 16/9538 707/706 |
| 2016/0019248 A1* | 1/2016 | Hu ...................... G06F 16/2246 707/722 |

(Continued)

FOREIGN PATENT DOCUMENTS

CN          111309843 A          6/2020

OTHER PUBLICATIONS

Touya et al., "Assessing Crowdsourced Poi Quality: Combining Methods Based on Reference Data, History, and Spatial Relations", ISPRS International Journal of Geo-Information, vol. 6, Mar. 14, 2017, pp. 1-29.

*Primary Examiner* — Dinku W Gebresenbet
(74) *Attorney, Agent, or Firm* — Jeffrey R. Moisan; HERE GLOBAL B.V.

(57) ABSTRACT

A method, apparatus and computer program product are provided for generating search engine input queries using point-of-interest information and permutations thereof to assess the quality of search results produced by and to improve the search engine. Methods may include: identifying a reference point-of-interest from a reference data database; extracting at least one point-of-interest attribute from the reference point-of-interest; identifying a geographic location of the reference point-of-interest; calculating a test query search center based on the geographic location of the reference point-of-interest; generating a test query based on (Continued)

the at least one point-of-interest attribute from the reference point-of-interest and the test query search center; querying a search engine using the test query; receiving one or more responses to the test query; analyzing the one or more responses to calculate response quality metrics; and modifying the search engine based at least in part on the metrics.

20 Claims, 8 Drawing Sheets

(56) References Cited

U.S. PATENT DOCUMENTS

| | | | |
|---|---|---|---|
| 2018/0260417 A1* | 9/2018 | Mahadevan | G06F 16/5866 |
| 2020/0334260 A1* | 10/2020 | Kussmaul | G06F 3/0486 |
| 2021/0209013 A1 | 7/2021 | Xu et al. | |
| 2024/0143680 A1* | 5/2024 | Cui | G06F 16/9535 |

* cited by examiner

| Query type | Reality name | Reality engineered query | Modified query | | |
|---|---|---|---|---|---|
| | | | Character level - deletion | Character level - insertion | Character level - flipping characters |
| POI name | McDonald's | McDonald's | McDnald | MceDonald's | McDnoald's |
| Street name | University Blvd | University Blvd | Unversity Blvd | Unieversity Blvd | Unievrsity Blvd |

| Query type | Reality name | Reality Engineered query | Modified query | | |
|---|---|---|---|---|---|
| | | | Word level - deletion | Word level - synonyms | Word level - stemming + deletion |
| POI name | Perkins Restaurant & Bakery | Perkins Restaurant & Bakery | Perkins | Perkins food | Perkins rest |
| Street name | Millenia Plaza Way | Millenia Plaza Way | Millenia Plaza | Millenia square | Millen Plaz |

FIG. 6

METHOD AND APPARATUS FOR AUTOMATED QUERY GENERATION FOR SEARCH SYSTEM QUALITY ASSESSMENT

TECHNOLOGICAL FIELD

Example embodiments of the present invention relate generally to the automatic generation of queries for assessing a quality of search results related to the queries, and more particularly, to generated search engine input queries using point-of-interest information and permutations thereof to assess the quality of search results produced by the search engine.

BACKGROUND

Conducting searches in online databases such as the internet has become an essential way to navigate the immense volume of data available. Similarly, within digital maps, map search functionality has become an essential part of daily life that helps people discover places of interest and to navigate to destinations. When a user inputs a query, a search of a point-of-interest database is performed to obtain relevant and reliable information about nearby points-of-interest. The perceived quality of the search output depends upon the accuracy of the information provided to the user and the relevance to the search query. Low accuracy of returned results can degrade the user experience and can lead to poor user perception about the map search interface. Common examples of low accuracy search results include outdated results (e.g., a store that has closed) or places located too far away to be relevant or convenient.

Accuracy of the content returned by the search is essential for a positive user experience and is validated by generating and evaluating various metrics. These metrics encompass a range of place attributes including whether the place returned by the search is open or closed, is a duplicate, has accurate geographic coordinates, and whether the place name, street address, phone number, place category, etc. reflects current ground truth information from reality or other chosen reference data. To ensure that the quality of search output is maintained, search quality metrics must be generated frequently with a statistically significant quantity of search results.

BRIEF SUMMARY

Accordingly, a method, apparatus, and computer program product are provided for automatic generation of queries for assessing a quality of search results related to the queries, and more particularly, to generated search engine input queries using point-of-interest information and permutations thereof to assess the quality of search results produced by and to improve the search engine. In a first example embodiment, an apparatus is provided including at least one processor and at least one memory including computer program code, the at least one memory and the computer program code may be configured to, with the at least one processor, cause the apparatus to: identify a reference point-of-interest from a reference data database; extract at least one point-of-interest attribute from the reference point-of-interest; identify a geographic location of the reference point-of-interest; calculate a search center for a test query based on the geographic location of the reference point-of-interest and selected proximity from the reference point-of-interest; generate the test query based on the a selected point-of-interest attribute from the reference point-of-interest and the search center; query a search engine using the test query; receive one or more responses to the test query; analyze the one or more responses to calculate response quality metrics; and modify the search engine based, at least in part, on the test query, the one or more responses, and the response quality metrics.

Causing the apparatus of some embodiments to generate the test query based on the selected point-of-interest attribute from the reference point-of-interest and the search center includes causing the apparatus to: modify the at least one point-of-interest attribute according to at least one modification strategy to mimic user idiosyncrasy, where the at least one strategy includes one or more of a word-level modification strategy or a character-level modification strategy to obtain at least one modified point-of-interest attribute; and generate at least one modified test query based on the at least one modified point-of-interest attribute.

Causing the apparatus of some embodiments to modify the at least one point-of-interest attribute according to the at least one of the word-level modification strategy and the character-level modification strategy includes causing the apparatus to: label and weight each term of the test query; perform word-level modification of a first strategy for each term of the test query having a weight satisfying a predetermined threshold; perform word-level modification of a second strategy for each term of the test query having a weight failing to satisfy the predetermined threshold; and perform character-level modification to each term of the test query.

According to some embodiments the word-level modification of the first strategy consists of word stemming and character level deletion, replacement, and insertion. According to certain embodiments the word-level modification of the second strategy includes word deletion, word stemming, synonym replacement, and character level deletion, replacement, and insertion.

The apparatus of some embodiments is further caused to: retrieve user-generated queries, where causing the apparatus to modify the at least one point-of-interest attribute according to at least one modification strategy includes causing the apparatus to modify the at least one point-of-interest attribute based, at least in part, on the user-generated queries. The apparatus of some embodiments is further caused to: provide for presentation of response quality metrics on a user interface display.

Causing the apparatus of certain embodiments to analyze the one or more responses to calculate response quality metrics includes causing the apparatus to analyze the one or more responses relative to the reference point-of-interest to calculate response quality metrics.

Embodiments provided herein include a method including: identifying a reference point-of-interest from a reference data database; extracting at least one point-of-interest attribute from the reference point-of-interest; identifying a geographic location of the reference point-of-interest; calculating a search center for a test query based on the geographic location of the reference point-of-interest and selected proximity from the reference point-of-interest; generating the test query based on a selected point-of-interest attribute from the reference point-of-interest and the search center; querying a search engine using the test query; receiving one or more responses to the test query; analyzing the one or more responses to calculate response quality metrics; and modifying the search engine based, at least in part, on the test query, the one or more responses, and the response quality metrics.

According to some embodiments, generating the test query based on the selected point-of-interest attribute from the reference point-of-interest and the search center includes: modifying the at least one point-of-interest attribute according to at least one modification strategy to mimic user idiosyncrasy, where the at least one strategy includes one or more of a word-level modification strategy or a character-level modification strategy to obtain at least one modified point-of-interest attribute; and generating at least one modified test query based on the at least one modified point-of-interest attribute.

According to certain embodiments, modifying the at least one point-of-interest attribute according to the at least one of the word-level modification strategy and the character-level modification strategy includes: labelling and weight each term of the test query; performing word-level modification of a first strategy for each term of the test query having a weight satisfying a predetermined threshold; performing word-level modification of a second strategy for each term of the test query having a weight failing to satisfy the predetermined threshold; and performing character-level modification to each term of the test query.

According to some embodiments the word-level modification of the first strategy consists of word stemming and character level deletion, replacement, and insertion. According to some embodiments the word-level modification of the second strategy includes word deletion, word stemming, synonym replacement, and character level deletion, replacement, and insertion.

The method of some embodiments further includes retrieving user-generated queries, where modifying the at least one point-of-interest attribute according to at least one modification strategy includes modifying the at least one point-of-interest attribute based, at least in part, on the user-generated queries. The method of some embodiments further includes providing for presentation of response quality metrics on a user interface display. According to some embodiments analyzing the one or more responses to calculate response quality metrics includes analyzing the one or more responses relative to the reference point-of-interest to calculate response quality metrics.

Embodiments provided herein include a computer program product including at least one non-transitory computer-readable storage medium having computer-executable program code instructions stored therein, the computer-executable program code instructions including program code instructions to: identify a reference point-of-interest from a reference data database; extract at least one point-of-interest attribute from the reference point-of-interest; identify a geographic location of the reference point-of-interest; calculate a search center for a test query based on the geographic location of the reference point-of-interest and selected proximity from the reference point-of-interest; generate the test query based on the a selected point-of-interest attribute from the reference point-of-interest and the search center; query a search engine using the test query; receive one or more responses to the test query; analyze the one or more responses to calculate response quality metrics; and modify the search engine based, at least in part, on the test query, the one or more responses, and the response quality metrics.

According to some embodiments the program code instructions to generate the test query based on the selected point-of-interest attribute from the reference point-of-interest and the search center include program code instructions to: modify the at least one point-of-interest attribute according to at least one modification strategy to mimic user idiosyncrasy, where the at least one strategy includes one or more of a word-level modification strategy or a character-level modification strategy to obtain at least one modified point-of-interest attribute; and generate at least one modified test query based on the at least one modified point-of-interest attribute.

According to some embodiments, the program code instructions to modify the at least one point-of-interest attribute according to at least one of the word-level modification strategy and the character-level modification strategy include program code instructions to: label and weight each term of the test query; perform word-level modification of a first strategy for each term of the test query having a weight satisfying a predetermined threshold; perform word-level modification of a second strategy for each term of the test query having a weight failing to satisfy the predetermined threshold; and perform character-level modification to each term of the test query.

According to certain embodiments the word-level modification of the first strategy consists of word stemming and character level deletion, replacement, and insertion, and where the word-level modification of the second strategy includes word deletion, word stemming, synonym replacement, and character level deletion, replacement, and insertion.

Embodiments provided herein include an apparatus including: means for identifying a reference point-of-interest from a reference data database; means for extracting at least one point-of-interest attribute from the reference point-of-interest; means for identifying a geographic location of the reference point-of-interest; means for calculating a search center for a test query based on the geographic location of the reference point-of-interest and selected proximity from the reference point-of-interest; means for generating the test query based on a selected point-of-interest attribute from the reference point-of-interest and the search center; means for querying a search engine using the test query; means for receiving one or more responses to the test query; means for analyzing the one or more responses to calculate response quality metrics; and means for modifying the search engine based, at least in part, on the test query, the one or more responses, and the response quality metrics.

According to some embodiments, the means for generating the test query based on the selected point-of-interest attribute from the reference point-of-interest and the search center includes: means for modifying the at least one point-of-interest attribute according to at least one modification strategy to mimic user idiosyncrasy, where the at least one strategy includes one or more of a word-level modification strategy or a character-level modification strategy to obtain at least one modified point-of-interest attribute; and means for generating at least one modified test query based on the at least one modified point-of-interest attribute.

According to certain embodiments, the means for modifying the at least one point-of-interest attribute according to the at least one of the word-level modification strategy and the character-level modification strategy includes: means for labelling and weight each term of the test query; means for performing word-level modification of a first strategy for each term of the test query having a weight satisfying a predetermined threshold; means for performing word-level modification of a second strategy for each term of the test query having a weight failing to satisfy the predetermined threshold; and means for performing character-level modification to each term of the test query.

According to some embodiments the word-level modification of the first strategy consists of word stemming and character level deletion, replacement, and insertion. According to some embodiments the word-level modification of the second strategy includes word deletion, word stemming, synonym replacement, and character level deletion, replacement, and insertion.

The apparatus of some embodiments further includes means for retrieving user-generated queries, where the means for modifying the at least one point-of-interest attribute according to at least one modification strategy includes means for modifying the at least one point-of-interest attribute based, at least in part, on the user-generated queries. The method of some embodiments further includes providing for presentation of response quality metrics on a user interface display. According to some embodiments the means for analyzing the one or more responses to calculate response quality metrics includes means for analyzing the one or more responses relative to the reference point-of-interest to calculate response quality metrics.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
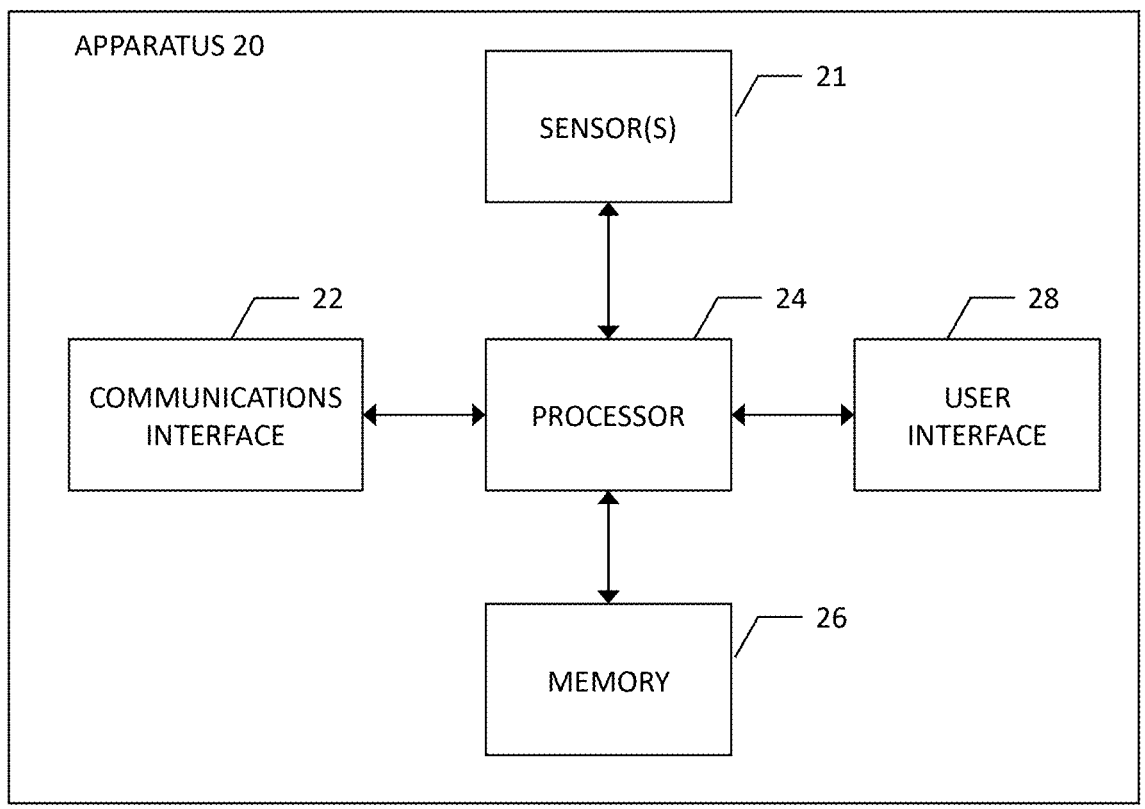
Figure 2:
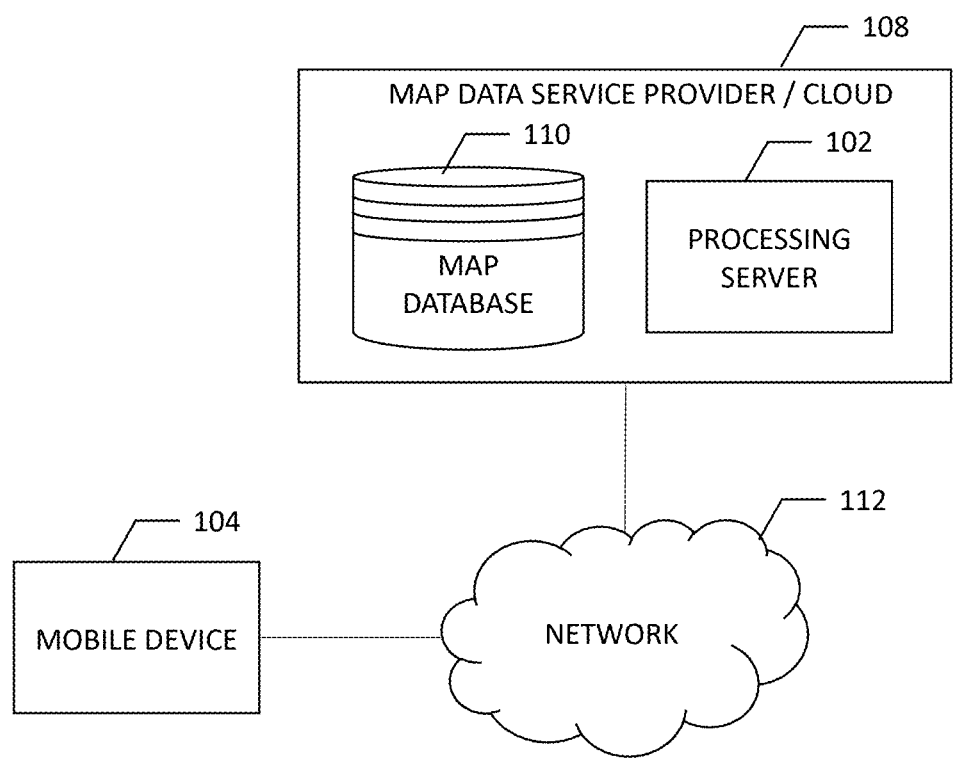
Figure 3:
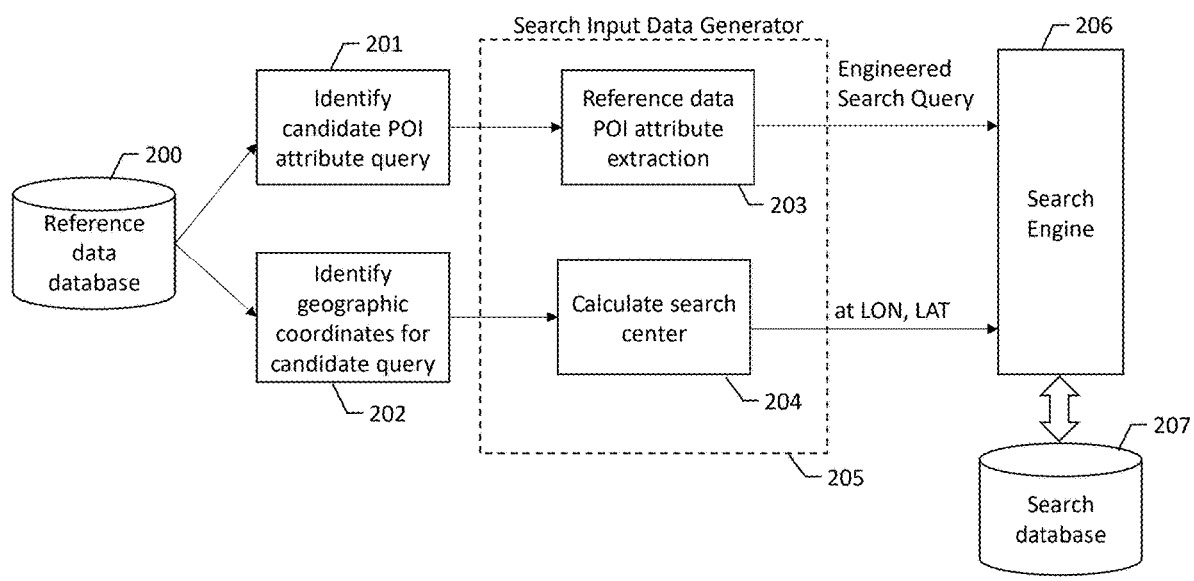
Figure 4:
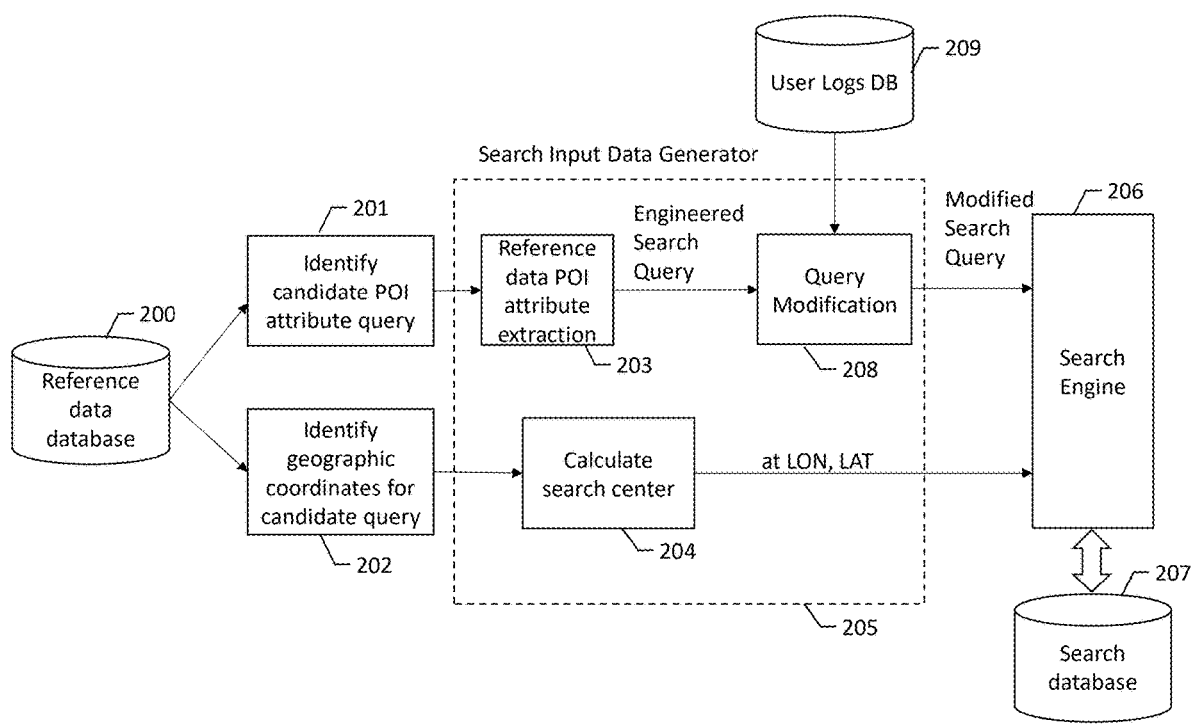
Figure 5:
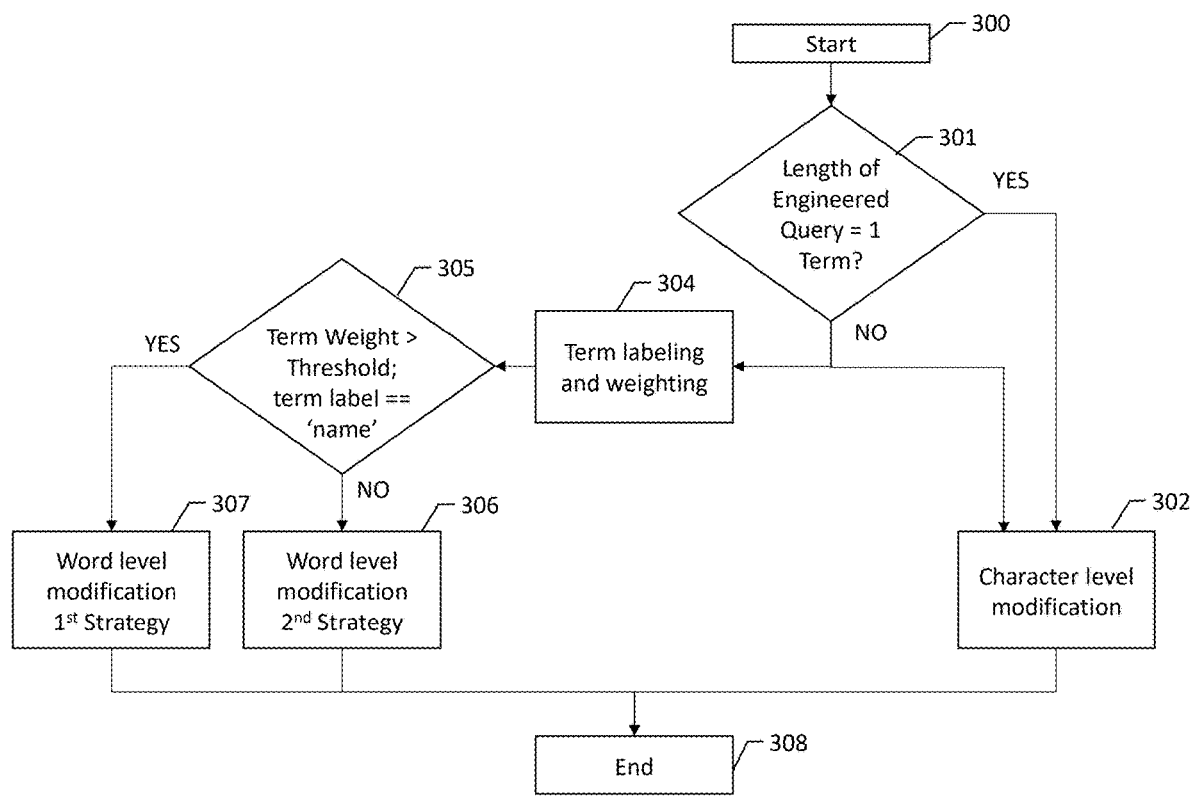
Figure 7:
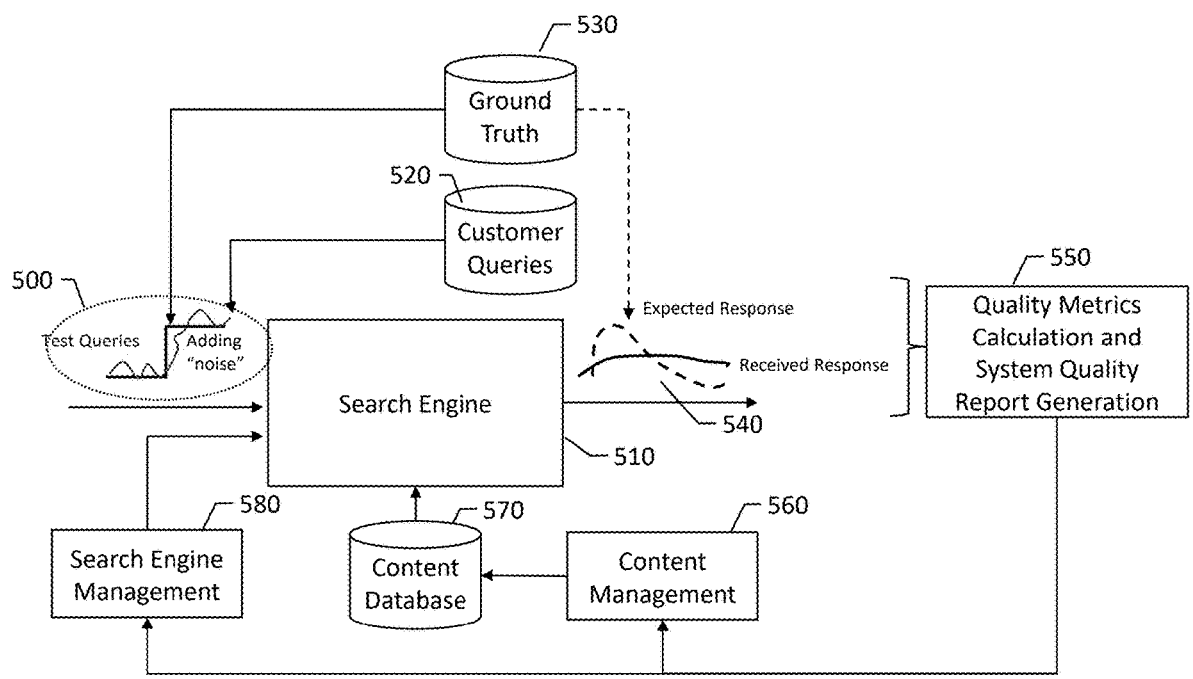
Figure 8:
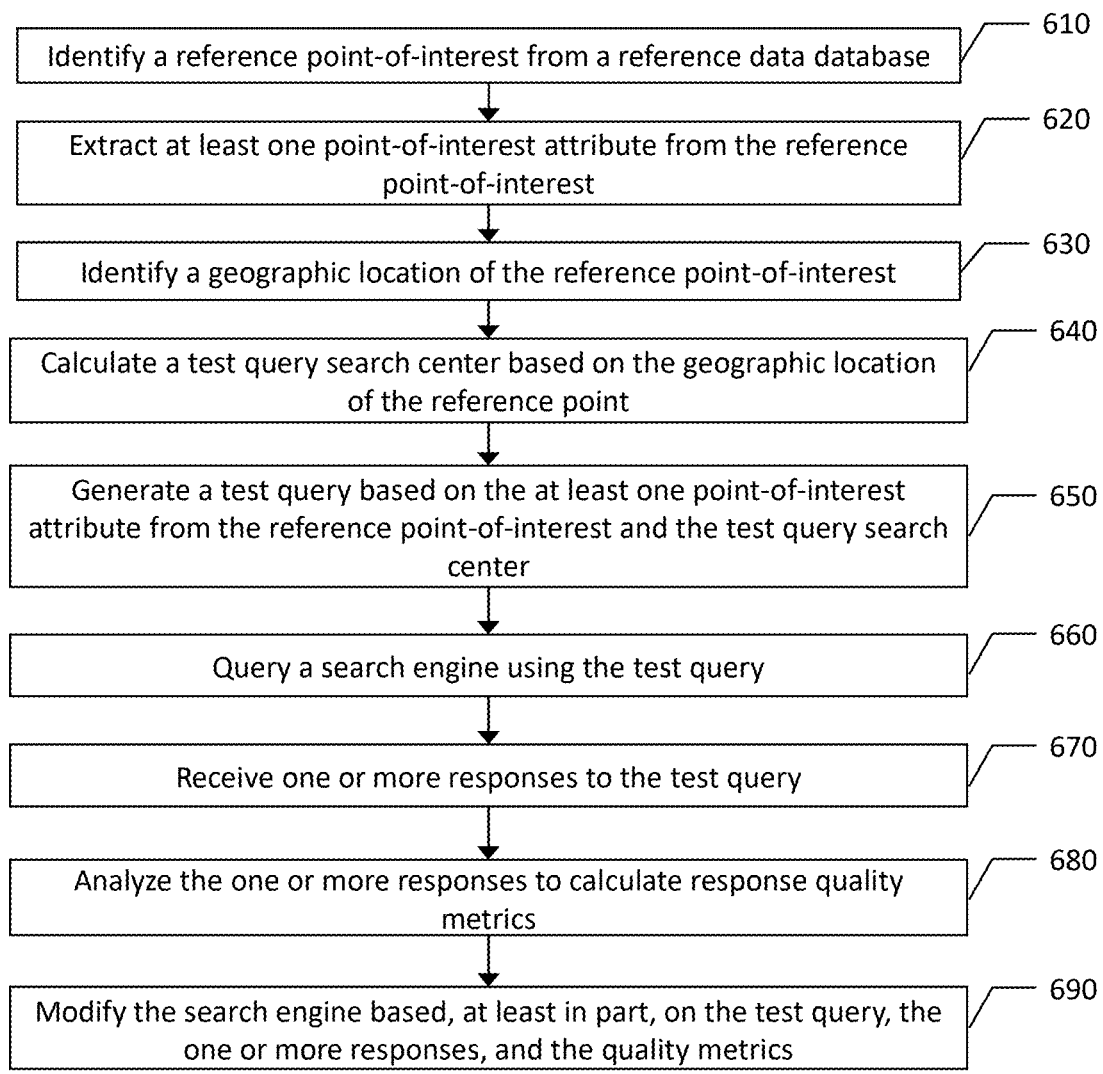

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for testing and improving a search engine according to an example embodiment of the present disclosure;

FIG. 3 illustrates a block diagram of an example environment in which a search input data generator can be implemented according to an example embodiment of the present disclosure;

FIG. 4 illustrates an example embodiment of modified search query generation according to an example embodiment of the present disclosure;

FIG. 5 illustrates a process flow chart of an example of query modification that includes possible enhancements in the textual engineered query according to an example embodiment of the present disclosure;

FIG. 6 illustrate character level query modification and word level query modification according to an example embodiment of the present disclosure;

FIG. 7 illustrates a system employing the test query generation including engineered search queries and/or modified search queries to improve search engine performance according to an example embodiment of the present disclosure; and FIG. 8 illustrates a flowchart depicting a method according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for the automatic generation of queries for assessing a quality of search results related to the queries, and more particularly, to generated search engine input queries using point-of-interest information and permutations thereof to assess the quality of search results produced by the search engine. Conducting searches, whether with respect to searching for points-of-interest within a map or more generally searching using a search engine, is challenging. Assessing the quality of search results is important for the understanding of how well the search engine functions and how well queries are correctly understood. To assess the quality of a search engine, test search queries can be run with a quality measure of the results returned. However, this type of assessment can be laborious and resource intensive.

Embodiments described herein automatically generate test queries for a search engine, modify queries, and conduct the searches. The results are assessed based on their quality and relevance to the test query. An important aspect of search quality testing is the preparation of the test data. Test data can be and is frequently obtained from existing sources, such as user logs. Use of user logs can require significant resources and often includes low quality data that is difficult to assess result quality against. User log contents must be assessed before being used for quality testing. User log queries with broader meaning or those that don't reflect places in reality with respect to map searching cannot be tested since the relevance of the application programming interface returns cannot be determined.

According to an example embodiment, the input query for a map search of "mikey" may be used as a broad search where the search engine returns several places in proximity of the input query that can denote different points-of-interest, such as a restaurant (e.g., Mikey Fin's Brewery), a food delivery service (e.g., Chez Mikey), or a comedy show (e.g., Mikey O Comedy Show). The end-user intent of the query is unclear, and it cannot be determined which application programming interface return should be tested against the input query. Further, ambiguous queries for which context cannot be determined should be excluded from testing. User log queries that include irrelevant data, such as "cliff", "sport", "building" are terms that do not represent points-of-interest, such that these terms are of no value. User logs include poor and noisy input data, such as unnecessary words. Thus, using user logs for test data requires scrutiny that increases resource consumption while not necessarily obtaining beneficial test data.

To obtain accurate quality measures for search engine results, a significant amount of test data is necessary and critical for accuracy and repeatability. Removing inappropriate queries can result in insufficient and imbalanced data and impact the statistical significance of key performance indicators across different query types. Further, biases can arise from how the data is selected, filtered, and eliminated. Selection of queries that will be tested also requires significant human inspection, which significantly increases cost and resource requirements.

Generally, user queries within map searches are manually interpreted by annotation teams which generally include a plurality of team members. Annotation team members interpret the meaning of the user query, the potential user intent, and the potential reality location the query might represent. Individual team member assessments are combined by using the majority vote approach to make the final determination for each query. Existing sources of data, such as user logs, can also be inadequate to cover all real world use cases. Search engine testing by using user logs requires significant human resources and incurs significant costs. Embodiments provided herein provide a faster, automated, and higher capacity process for search quality testing that reduces the cost of collecting and annotating additional data. This method significantly reduces the cost for search testing when implemented in production.

Generating diverse test data to quantify and improve map search queries dramatically scales the availability of test data which improves the reliability of analysis of the quality of map searches. The permutations on query test data to engineer new query test data reflective of real-world query variations enhances the robustness of a search engine by readying the search engine for real-world queries and the inherent variation therein. Improving the function of a search engine through improving query responses to test data provides a search engine that is more likely to return satisfactory results to a user. The users can then more reliably use the search engine to confidently find what they are looking for within a map database, and to navigate to a target point-of-interest.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface whereby a user can enter a search query for points-of-interest. For example, the computing device may be an Advanced Driver Assistance System module (ADAS) which may at least partially control autonomous or semi-autonomous features of a vehicle. However, as embodiments described herein may optionally be used for map searching and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems.

In some embodiments where some level of vehicle autonomy is involved or can be used in association with the digital map and navigation, the apparatus 20 may be embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated, e.g., in communication, with any number of sensors 21, such as a global satellite navigation system (GNSS) such as the global positioning system (GPS), accelerometer, an image sensor, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a graphics processing unit (GPU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA, GPUs (Graphics Processing Units) or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance, whereby a user may be able to search for points-of-interest via the mapping or navigation application using search queries. For example, the apparatus 20 may provide for display of a map and/or instructions for following a route within a network of roads via user interface 28 to reach a destination or target point-of-interest. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

Embodiments of the present disclosure can be employed to provide navigational assistance to a human driver and/or to an autonomous or semi-autonomous vehicle to reach a target point-of-interest. Navigational assistance can include information that helps guide operation of a vehicle within the environment and/or along a specific route (e.g., route guidance). Navigational assistance can include road sign identification and communication to a vehicle operator. For example, navigational assistance can include the identification of a speed limit sign and the speed limit governing a road segment along which a vehicle is traveling. This speed limit can be conveyed to an operator of the vehicle and the operator can be advised of deviation (above or below) from the speed limit.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. The map database 110 can be enhanced with detailed point-of-interest information to include details on POI type, POI hours, POI user ratings, POI services offered, etc. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. User-provided information in the form of crowd-sourced data can be used to improve or enhance map data, particularly with respect to POI information. Further, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate or complementary embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

With the volume of data available within the map database 110, identifying a specific point-of-interest may be difficult particularly if a user is unfamiliar with an area. Finding information within the map database 110 can be challenging given the volume of data collected and available with respect to points-of-interest and available routes to target destinations. To find a specific point-of-interest that a user may be interested in, user search queries are typically employed whereby a user may enter some amount of information in an effort to convey what they are looking for. As users are each very unique, the search queries can use different terminology, different levels of detail, different expressions, and can have differing strategies (e.g., searching for a category of point-of-interest vs. searching for a name of a point-of-interest). Search engines that scour map data for a response to a search query can vary in the quality of response. If a response to a search query includes irrelevant points-of-interest or destinations, a user will be unsatisfied with the results and likely blame the search engine regardless of how vague the search query was. In an effort to account for the wide variety of search queries that a search engine is likely to encounter, embodiments described herein train a search engine using test queries to obtain search results that are then qualitatively analyzed to determine search engine performance. The search engine can then be improved based on the qualitative analysis and teaching the search engine how to provide improved responses to search queries.

To adequately test and improve a search engine, a large volume of test queries are necessary. However, the generation and analysis of such queries using conventional manual methods is time consuming and costly. Embodiments described herein create engineered, high-quality input data for search quality testing at any scale. Embodiments described herein can complement existing testing methods based on user query logs and addresses several challenges such as a limited amount of high-quality user logs, low statistical significance of known performance metrics, and an insufficient quantity of real world use cases. Because embodiments described herein are automated, embodiments enable rapid testing and retesting on a large scale at a lower cost.

Embodiments described herein create engineered input data for search testing in the form of engineered queries. FIG. 3 is a block diagram of an example environment in which a search input data generator 205 can be implemented. Reference data database 200 is a structured data collection that encompasses a range of place attributes, such as point-of-interest (POI) name, address, phone number, category (e.g., goods/services provided), sub-category (e.g., type of specific good, such as cuisine for a restaurant), geographical location, etc. Reference data can include ground truth data (e.g., data obtained from a known-valid confirmed source), supplier data, competitor data, customer/user data, etc. According to an example embodiment, ground truth POI data collection may be used for identification of search input engineered data.

As shown, a candidate POI attribute query is identified at 201 from the list of POI attributes. In this implementation, an engineered query can be a POI name, street address, phone number, etc. whose values are extracted from reference data in the reference data database 200. An engineered query can be any POI attribute extracted from the reference data that a search engine may use to look for a target place. Thus, the test query is initially created based on a known POI, with the test query aiming to find the POI using the search engine by permutating the reference data POI attribute(s) through the processes described herein. This reference data POI attribute extraction is performed at 203 as part of the search input data generator 205. The extraction identifies which specific attribute(s) of the reference POI will be used to form the test query. Another aspect of engineered input data generation is identifying a search center location that represents the user position (or user selected position) at the moment when the user searches for a target place. The process of embodiments described herein selects the geo coordinates of the target place from the reference data at 202. In the illustrated embodiment the reference data is ground truth data and therefore this simulates the user position in the real world when looking for a place that exists in reality.

The search center that is calculated at 204 is calculated in an example embodiment by selecting a random distance and a random bearing (0-360°) with respect to the reference data POI's geographic position. Given the geographic location of the initial start point of the input query POI, given the initial randomly selected bearing from the start point and given the random distance from the start point, the search center location is calculated along a great circle arc (shortest distance) using the following equations:

$$\varphi_2 = a\sin(\sin\varphi_1\cdot\cos\delta + \cos\varphi_1\cdot\sin\delta\cdot\cos\theta) \quad \text{(Eq. 1)}$$

$$\lambda_2 = \lambda_1 + a\tan 2(\sin\theta\cdot\sin\delta\cdot\cos\varphi_1, \cos\delta - \sin\varphi_1\cdot\sin\varphi_2) \quad \text{(Eq. 2)}$$

where $\varphi_1$ is the latitude of the POI in reality, $\lambda_1$ is the longitude of the POI in reality, $\theta$ is the bearing (clockwise from north), $\delta$ is the angular distance d/R; d is the distance from the POI in reality, R is the earth's radius, $\varphi_2$ is the calculated search center latitude, and $\lambda_1$ is the calculated search center longitude. The equations above can be tailored to allow for the calculated search center to be closer to or further away from the reference POI.

The engineered search query is provided to the search engine 206 as a test query along with the test query search center calculated based on the aforementioned equations. This input can simulate a real, live search query from a person in the test query location with the test query as input. A search engine that can return a correct POI result with a greater distance between the calculated search center for the test query and the reference POI indicates a more robust and reliable search engine that would provide a more satisfactory user experience.

Embodiments described herein can modify search queries in such a way as to multiply the number of test queries generated and to account for various user-specific modifications to search queries. FIG. 4 illustrates an example embodiment of such a modified search query generation that takes textual engineered queries such as POI names or street names and modifies the text to reflect real end-user behavior that is learned from user logs shown as user log database 209. Modification of the engineered queries enables additional noise to be introduced into queries at the character or word level to make the search engine more robust to real-world queries.

As shown in FIG. 4, the candidate POI is identified at 201 as in FIG. 3, and the reference data POI attribute extraction occurs at 203. However, the engineered search query gets further modification at query modification 208 before the modified search query is provided to the search engine 206. The modification can be implemented in several ways as described herein.

The engineered search query can have a textual length of the POI name, street address, or the like that can vary from a single word with few characters to a string of words. FIG. 5 illustrates a process flow chart of an example of query modification that includes possible enhancements in the textual engineered query. As shown, the process starts at 300 and a determination is made at 301 of whether the engineered query is only a single term. If so, the engineered query is modified through character level modification at 302. Character level modification ensures that randomly selected characters can be flipped, deleted, or inserted at any position. This type of modification accounts for spelling inaccuracies and typos that may be commonly entered in search queries. Such modification tests the quality and robustness of a search engine to handle misspellings in queries while being able to return the accurate and correct response.

Multiple operations and modifications can be performed at the same time where different weights may be assigned to different operations. If the length of the engineered query is greater than one at 301, the query has multiple terms and the modification can be implemented at character level as applied to individual words at 302 and on the per-word level.

Word-level modification ensures that long queries are shortened or that some terms are replaced with their synonyms or commonly interchanged words. Shortening of queries can be achieved in different ways: stemming of the term, deletion of stop words, or deletion of the common terms. Query modification can use term labeling and weighting at 304 when the engineered query includes multiple terms. This process facilitates the identification of terms that will undergo modification at the word level. For example, each term of the query is labeled at 304 according to different word types. These word types can include, for example, a name (business, first, last, etc.), category (e.g., type), location (e.g., city name, county name, etc.). In addition, each term is assigned a weight that indicates its relative importance of the term within the collection of terms in the engineered search query. Less weight is assigned to frequent terms when compared to rare words which are assigned a higher weight. For example, the weight of the terms can be expressed using the term frequency-inverse document frequency. When the weight of the term is above a predefined threshold and the term is labeled as a name or as a location at 305, this will lead to fewer modifications and preserve critical word. Name terms can only be modified in certain ways, as a substitution of a name would yield an improperly modified engineered query.

If a term is afforded a higher weight above a predefined threshold, the word level modification may be performed using a first strategy at 307. This first strategy may only include stemming of the word or no changes at all in the word level. Character level modification remains possible, as misspellings and typos still occur in names. If a term is afforded a lower weight and deemed to not be a name at 305, word level modification of a second strategy is performed at 306. These non-name words may be modifiers, adjectives, or other words that are not as uniquely associated with a POI. Thus, this second strategy of word level modification at 306 can include word deletion, word stemming, synonym replacement, common words used in lieu of a word, or no change. These non-name words have more flexibility in a search query and can thus be modified more widely to better reflect how POI modifiers may be employed in real-world search queries. After word level modification of the engineered query at 306 and 307 and the character level modification at 302, the engineered query becomes the modified search query that is fed as a test query into search engine 206 as shown in FIG. 4. This approach avoids deletion of specific words such as a first name, last name, business, or any other term that may uniquely define the context of the POI name or address.

Applied operations have a dynamic nature and produce different modifications on the same query. This enables a single engineered query to be modified into a multitude of modified search queries that can each be used as a test query for the search engine. Every time the computational method reflected in FIG. 5 is performed different operations may be performed. Randomly selected characters may be flipped or deleted, new characters inserted at random positions, and different modifications are randomly chosen or applied with different weights. This process ensures a greater volume of diverse data leading to more frequent testing in an automated manner.

The modifications at a word level and at a character level may be informed by the user logs database 209 of FIG. 4. For example, common misspellings of names may be understood to be recurring such that those misspellings may be introduced into modified search queries. Further, while POIs may have formal or official names, POIs may obtain nicknames or colloquial terms that uniquely reference a POI. One such example is sports stadiums that often receive nicknames from fan bases. These terms and misspellings thereof can be used in the modification of search queries. User logs may also capture search terms that may be found to be common for a particular destination. For example, if a restaurant is known for a particular dish, a search query may include "that place with the particular dish". Map databases may not be compatible with such search strategies; however, using user logs can identify these nuances and improve the search engine by associating the search queries with the particular POI.

The tables shown in FIG. 6 illustrate character level query modification in table 400 and word level query modification in table 450. These tables illustrate how changes in the text can produce different queries while maintaining the same context as the original query. Character level modifications in table 400 introduce ambiguity and generate idiosyncrasies that are similar to queries created by end users including grammatical errors, abbreviations, misspellings, etc. In the example in table 450 the implementation avoids deleting or replacing the last name "Perkins" that uniquely defines the context of the POI name. Another example in the table 450 is the street name "Millenia" that uniquely identifies the street address. Common words such as "way," "plaza," or categories such as "restaurant", "bakery," etc. can be replaced with synonyms since they generally have a lower weighting and don't satisfy the threshold at 305 in FIG. 5.

The computational methods described herein can be used for reporting search known performance indicators with the reference data and reference points-of-interest data as ground truth. Due to the dynamic nature of data generation where random modifications can introduce different variations into the data, the existing reference data can be used multiple times over a period of time for known performance indicator reporting. The introduced known performance indicators demonstrate overall quality report of a search engine that combines content accuracy and search function performance.

Embodiments employ the test queries and responses to the test queries to generate quality metrics to rate the performance of the search engine, and to modify the search engine to better handle queries where the response to the query is incorrect or inaccurate in any way. FIG. 7 illustrates a system employing the test query generation including engineered search queries and/or modified search queries to improve search engine performance.

As shown in FIG. 7, the test queries including one or both of engineered queries and modified queries are fed at 500 as test data into the search engine 510 including added noise from customer queries 520 or user logs. Noise from customer queries represent errors that users make when typing the queries such as missing characters, abbreviations, etc. In addition to typing, errors that users make can include errors in voice-to-text or speech recognition that occur based on user speech patterns. Embodiments described herein learns patterns of user errors based on the user logs. Ground truth 530 is used as the basis for the queries before they are engineered or modified into the test queries as described above with respect to FIGS. 3 and 4. The search engine 510 produces a response shown at 540, where the expected response is based on the ground truth data 530 that was the source for the test query, while the received response may be incorrect or inaccurate for some test queries. The expected response versus received response at 540 is used for quality metrics calculation and system quality report generation at 550. Based on the feedback from inaccurate or incorrect responses, improvements to the search engine may be performed.

The quality metrics and system quality report 550 provide information for content management 560 which can improve a map database to include data within the map data that can more closely tie a POI to a query. For example, the content management 560 may include where the map data of a map database learns that a sports stadium has a colloquial nickname. Once the content management 560 associates the colloquial nickname to the sports stadium and adds this to the content database 570, queries including the colloquial nickname may routinely and accurately identify the sports stadium.

In addition to content management, search engine management 580 is performed. Search engine management 580 can train the search engine using both accurate search engine responses to test queries and inaccurate search engine responses to test queries. In the event that a test query returns an inaccurate result, the test query and the correct result based on the ground truth 530 data may be fed back to the search engine to learn that a query including the test query language from the test query search center location should return the accurate result. Because embodiments described herein produce voluminous test data for low cost and relatively low processing requirements, the number of test queries that can be processed and the results thereof fed back into the search engine can dramatically improve search engine performance and accuracy, leading to improved customer satisfaction.

FIG. 8 illustrates a flowchart depicting a method according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks.

These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 8 is a flowchart of a method for generating search engine input queries using point-of-interest information and permutations thereof to assess the quality of search results produced by and to improve the search engine. As shown, a reference point-of-interest is identified from a reference data database at 610. From the reference point-of-interest, at least one point-of-interest attribute is extracted at 620. A geographic location of the reference point-of-interest is identified at 630 and a search center for a test query based on this geographic location of the reference point-of-interest and a selected proximity from the reference point-of-interest is calculated at 640. The test query is then generated at 650 based on the selected point-of-interest attribute from the reference point-of-interest and the search center. The test query is used at 660 to query a search engine, and one or more responses to the test query are received at 670. The one or more responses are analyzed to calculate the response quality metrics at 680, and the search engine is modified based, at least in part, on the test query, the one or more responses, and the quality metrics at 690.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising at least one processor and at least one non-transitory memory including computer program code instructions, the computer program code instructions configured to, when executed, cause the apparatus to at least:

identify a reference point-of-interest from a reference data database;

extract at least one point-of-interest attribute from the reference point-of-interest;

identify a geographic location of the reference point-of-interest;

calculate a search center for a test query based on the geographic location of the reference point-of-interest and selected proximity from the reference point-of-interest;

generate the test query based on the a selected point-of-interest attribute from the reference point-of-interest and the search center;

query a search engine using the test query;

receive one or more responses to the test query;

analyze the one or more responses to calculate response quality metrics and generate a system quality report; and modify the search engine based, at least in part, on the test query, the one or more responses, the response quality metrics, and the system quality report.

2. The apparatus of claim 1, wherein causing the apparatus to generate the test query based on the selected point-of-interest attribute from the reference point-of-interest and the search center comprises causing the apparatus to:

modify the at least one point-of-interest attribute according to at least one modification strategy to mimic user idiosyncrasy, wherein the at least one strategy comprises one or more of a word-level modification strategy or a character-level modification strategy to obtain at least one modified point-of-interest attribute; and generate at least one modified test query based on the at least one modified point-of-interest attribute.

3. The apparatus of claim 2, wherein causing the apparatus to modify the at least one point-of-interest attribute according to the at least one of the word-level modification strategy and the character-level modification strategy comprises causing the apparatus to:

label and weight each term of the test query;

perform word-level modification of a first strategy for each term of the test query having a weight satisfying a predetermined threshold;

perform word-level modification of a second strategy for each term of the test query having a weight failing to satisfy the predetermined threshold; and perform character-level modification to each term of the test query.

4. The apparatus of claim 3, wherein the word-level modification of the first strategy consists of word stemming and character level deletion, replacement, and insertion.

5. The apparatus of claim 4, wherein the word-level modification of the second strategy comprises word deletion, word stemming, synonym replacement, and character level deletion, replacement, and insertion.

6. The apparatus of claim 2, wherein the apparatus is further caused to:

retrieve user-generated queries, wherein causing the apparatus to modify the at least one point-of-interest attribute according to at least one modification strategy comprises causing the apparatus to modify the at least one point-of-interest attribute based, at least in part, on the user-generated queries.

7. The apparatus of claim 1, wherein the apparatus is further caused to:

provide for presentation of response quality metrics and the system quality report on a user interface display.

8. The apparatus of claim 1, wherein causing the apparatus to analyze the one or more responses to calculate response quality metrics and generate the system quality report comprises causing the apparatus to analyze the one or more responses relative to the reference point-of-interest to calculate response quality metrics and generate the system quality report.

9. A method comprising:

identifying a reference point-of-interest from a reference data database;

extracting at least one point-of-interest attribute from the reference point-of-interest;

identifying a geographic location of the reference point-of-interest;

calculating a search center for a test query based on the geographic location of the reference point-of-interest and selected proximity from the reference point-of-interest;

generating the test query based on a selected point-of-interest attribute from the reference point-of-interest and the search center;

querying a search engine using the test query;

receiving one or more responses to the test query;

analyzing the one or more responses to calculate response quality metrics and a system quality report; and modifying the search engine based, at least in part, on the test query, the one or more responses, the response quality metrics, and the system quality report.

10. The method of claim 9, wherein generating the test query based on the selected point-of-interest attribute from the reference point-of-interest and the search center comprises:

modifying the at least one point-of-interest attribute according to at least one modification strategy to mimic user idiosyncrasy, wherein the at least one strategy comprises one or more of a word-level modification strategy or a character-level modification strategy to obtain at least one modified point-of-interest attribute; and generating at least one modified test query based on the at least one modified point-of-interest attribute.

11. The method of claim 10, wherein modifying the at least one point-of-interest attribute according to the at least one of the word-level modification strategy and the character-level modification strategy comprises:

labelling and weight each term of the test query;

performing word-level modification of a first strategy for each term of the test query having a weight satisfying a predetermined threshold;

performing word-level modification of a second strategy for each term of the test query having a weight failing to satisfy the predetermined threshold; and performing character-level modification to each term of the test query.

12. The method of claim 11, wherein the word-level modification of the first strategy consists of word stemming and character level deletion, replacement, and insertion.

13. The method of claim 12, wherein the word-level modification of the second strategy comprises word deletion, word stemming, synonym replacement, and character level deletion, replacement, and insertion.

14. The method of claim 10, further comprising:

retrieving user-generated queries, wherein modifying the at least one point-of-interest attribute according to at least one modification strategy comprises modifying the at least one point-of-interest attribute based, at least in part, on the user-generated queries.

15. The method of claim 9, further comprising:

providing for presentation of response quality metrics and the system quality report on a user interface display.

16. The method of claim 9, wherein analyzing the one or more responses to calculate response quality metrics and generate the system quality report comprises analyzing the one or more responses relative to the reference point-of-interest to calculate response quality metrics and generate the system quality report.

17. A computer program product comprising at least one non-transitory computer-readable storage medium having computer-executable program code instructions stored therein, the computer-executable program code instructions comprising program code instructions to:
- identify a reference point-of-interest from a reference data database;
- extract at least one point-of-interest attribute from the reference point-of-interest;
- identify a geographic location of the reference point-of-interest;
- calculate a search center for a test query based on the geographic location of the reference point-of-interest and selected proximity from the reference point-of-interest;
- generate the test query based on the a selected point-of-interest attribute from the reference point-of-interest and the search center;
- query a search engine using the test query;
- receive one or more responses to the test query;
- analyze the one or more responses to calculate response quality metrics and generate a system quality report; and
- modify the search engine based, at least in part, on the test query, the one or more responses, the response quality metrics, and the system quality report.

18. The computer program product of claim 17, wherein the program code instructions to generate the test query based on the selected point-of-interest attribute from the reference point-of-interest and the search center comprise program code instructions to:
- modify the at least one point-of-interest attribute according to at least one modification strategy to mimic user idiosyncrasy, wherein the at least one strategy comprises one or more of a word-level modification strategy or a character-level modification strategy to obtain at least one modified point-of-interest attribute; and
- generate at least one modified test query based on the at least one modified point-of-interest attribute.

19. The computer program product of claim 18, wherein the program code instructions to modify the at least one point-of-interest attribute according to at least one of the word-level modification strategy and the character-level modification strategy comprise program code instructions to:
- label and weight each term of the test query;
- perform word-level modification of a first strategy for each term of the test query having a weight satisfying a predetermined threshold;
- perform word-level modification of a second strategy for each term of the test query having a weight failing to satisfy the predetermined threshold; and
- perform character-level modification to each term of the test query.

20. The computer program product of claim 19, wherein the word-level modification of the first strategy consists of word stemming and character level deletion, replacement, and insertion, and wherein the word-level modification of the second strategy includes word deletion, word stemming, synonym replacement, and character level deletion, replacement, and insertion.

* * * * *